Figure 1:
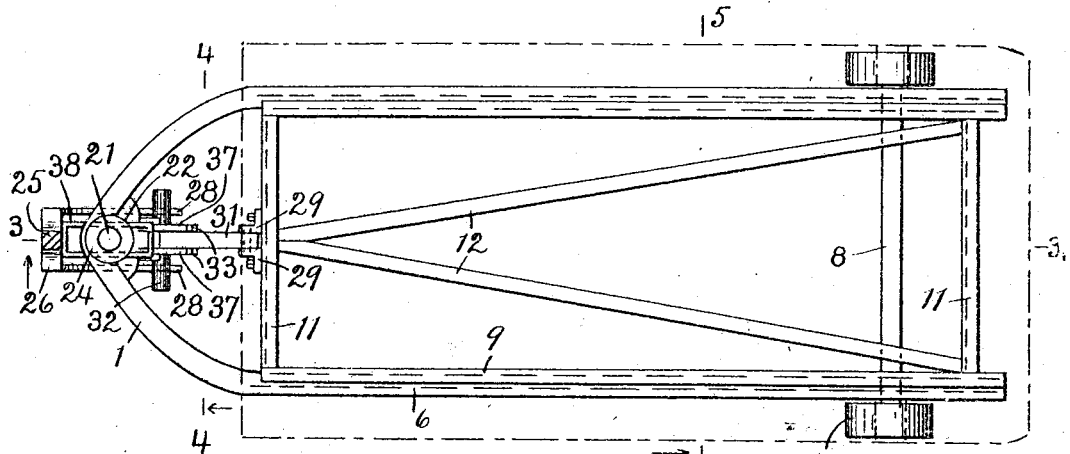

W. L. HAMILTON.
TRUCK.
APPLICATION FILED FEB. 16, 1912.

1,114,752.

Patented Oct. 27, 1914
2 SHEETS—SHEET 1.

WITNESSES:
G. A. Angier.
A. C. Fairbanks.

INVENTOR.
Walter Loomis Hamilton,
BY
Webster & Co.,
ATTORNEYS.

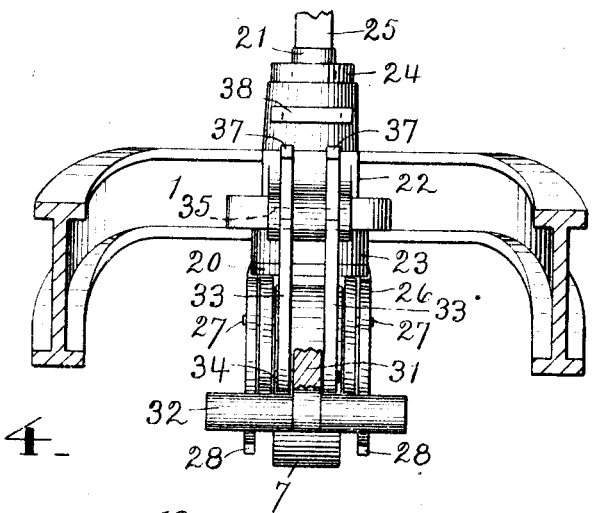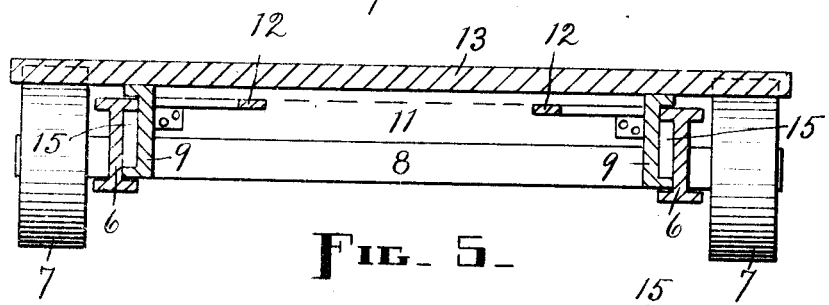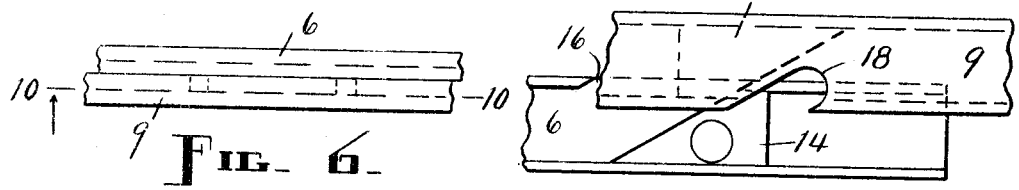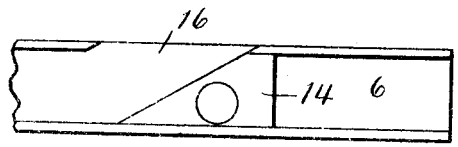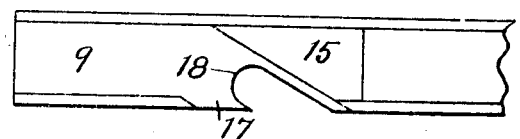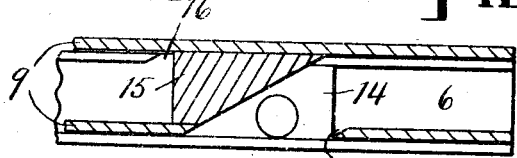

UNITED STATES PATENT OFFICE.

WALTER LOOMIS HAMILTON, OF HOLYOKE, MASSACHUSETTS.

TRUCK.

1,114,752.  Specification of Letters Patent.  Patented Oct. 27, 1914.

Application filed February 16, 1912. Serial No. 678,020.

*To all whom it may concern:*

Be it known that I, WALTER LOOMIS HAMILTON, a citizen of the United States of America, residing at Holyoke, in the county of Hampden and State of Massachusetts, have invented a new and useful Truck, of which the following is a specification.

My invention relates to improvements in trucks, and more especially to trucks such as are used in factories, warehouses, stores, and other places to haul goods or materials from one point to another by hand, and to such trucks in which the construction is of a nature whereby a horizontal movement can be converted into a vertical movement, and said invention resides particularly in a certain peculiar construction of the framework of the truck and in certain peculiar means or mechanism, operated by the handle or tongue of the truck, for operating in turn or moving the upper truck section in relation to the lower truck section, or vice versa, all as hereinafter set forth.

The objects of my invention are, first, to produce an elevating truck for use in raising goods or material from the support therefor, or with such support, from the floor, hauling said goods or material to any desired place, and there depositing the same, whereby a large saving in time, labor and expense is effected; second, to produce a truck of this kind and for this purpose which is comparatively simple, both in construction and operation, light and inexpensive, and, at the same time, very durable and exceedingly strong; third, to provide such a truck with powerful, quick-acting operating means which is under the control of the handle or tongue of the truck and may be said to be automatically controlled by the latter, to the end that said truck is not only rendered capable of handling a great weight, but of doing so with the expenditure of the minimum amount of exertion or effort on the part of the operator, and, fourth, to provide a truck which, while it has a sufficient range of elevation, is, nevertheless, so low, or is capable of being depressed to such an extent that it can be operated in connection with a stack of goods or material that is supported close to the floor, this being very advantageous because of the desirability of piling or stacking the goods or material without a great amount of space between the bottom of the same and the floor.

A preferred form of embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

Figure 2:
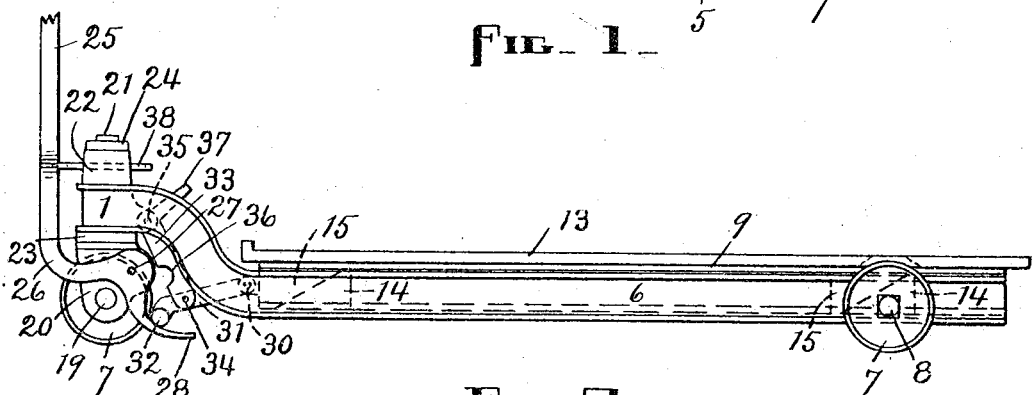
Figure 3:
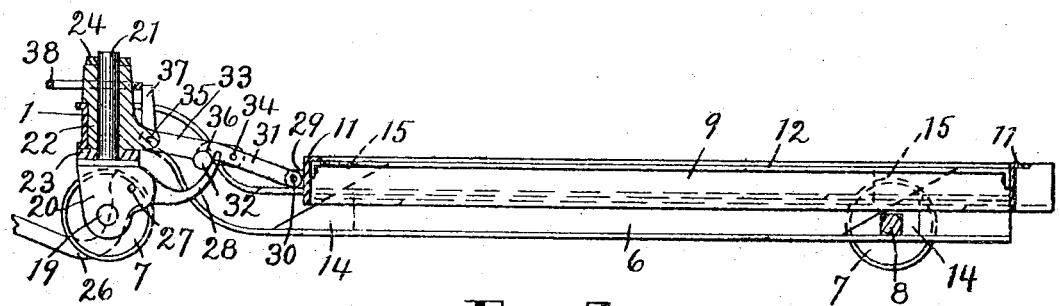

In the drawings, in which like numerals designate like parts throughout the several views, Figure 1 is a top plan of a truck which embodies said invention; Fig. 2, a side elevation of such truck; Fig. 3, a longitudinal vertical section through said truck, taken on lines 3—3, looking in the direction of the associated arrow, in Fig. 1, in this view, however, the upper truck section is raised and the operating mechanism disposed accordingly, while in the first two views such section is depressed and such mechanism correspondingly disposed; Fig. 4, an enlarged cross-section on lines 4—4, looking in the direction of the associated arrow, Fig. 1; Fig. 5, an enlarged cross-section on lines 5—5, looking in the direction of the associated arrow, Fig. 1; Fig. 6, an enlarged top plan of fragments, occupying their proper relation to each other, of the members on one side of the upper and under truck sections; Fig. 7, an enlarged inside elevation of the parts shown in the preceding view, the fragment of the upper truck section being represented in an elevated position; Fig. 8, an enlarged inside elevation of the lower truck-section fragment shown in Figs. 6 and 7; Fig. 9, an enlarged elevation of what is in reality the outside face of the upper truck-section fragment shown in said Figs. 6 and 7, and, Fig. 10, an enlarged longitudinal vertical section on lines 10—10, looking in the direction of the associated arrow, Fig. 6.

This truck comprises an under section or body mounted on rolls or wheels, a superimposed or upper section or platform arranged to be moved longitudinally or horizontally and vertically on said body, and mechanism for so moving said platform when the tongue of the truck is swung up and down on its pivot, provided there be no load on the truck; when the truck is loaded, however, the lower section instead of the upper section is the one that moves longitudinally, as will be more clearly disclosed hereinafter.

Preferably the frame or framework of the truck is constructed of one or more I-beams and channel-irons, together with whatever tie and brace members may be required, two angle-irons and two bars being used for the latter in the present case, although other materials may be substituted provided the required flanges be provided.

The lower section or body consists in this case of a single I-beam bent upwardly and forwardly at the front to form a prow 1 and having parallel side pieces 6—6. The body is supported at the back end by two wheels 7. The wheels 7 are mounted on an axle 8 which is journaled in the side pieces 6 adjacent to their rear ends, said wheels being outside of said side pieces.

The upper section or platform consists of side pieces 9—9 made of channel-irons, and end pieces 11—11 made of angle-irons. The end pieces 11 are rigidly attached to the side pieces 9, and may be braced by means of two bars 12, which have their forward ends rigidly attached to the front end piece in the center and their rear ends rigidly attached to the back end piece at or adjacent to the terminals of said last-mentioned end piece.

A flooring 13 may be provided for the platform, if desired, such flooring being placed on and attached, if necessary, in any suitable manner or by any suitable means to the side pieces 9 and the end pieces 11, and extending out over the wheels 7, substantially as shown by dot-and-dash lines in Fig. 1 and in full lines in Figs. 2 and 5.

The channel-iron side pieces 9 are situated inside of the I-beam side pieces 6 with the flanges of the channel-irons toward the outside, and with their upper flanges above the upper and inner I-beam flanges and their under flanges above the under and inner I-beam flanges. Thus situated it is plainly to be seen that, by a suitable disposition of coacting wedges between the body and platform, the latter can be respectively elevated and depressed when forced rearwardly and moved forwardly. To this end each side piece 6 is provided on the inside or between its inner flanges and adjacent to the terminals thereof with two wedge-blocks 14, and each side piece 9 is provided adjacent to the terminals thereof and between its flanges with two wedge-blocks 15, the two sets of four each coöperating with each other, or being so arranged that they can so coöperate. In the present construction the axle 8 passes through the two rear wedge-blocks 14. The inclined faces or edges of the wedge-blocks 14 are toward the front, that is to say, each wedge-block has a face or edge that slants downwardly and forwardly, while the inclined faces or edges of the wedge-blocks 15 are toward the rear, or slant upwardly and rearwardly. The slanting or inclined edges of each pair of coöperating wedge-blocks 14 and 15, the former below and the latter above, are in contact with and may slide upon each other. As shown at 16, the upper flange of each side piece 6 on the inside is cut away above the inclined face of each wedge-block 14, with which said side piece is provided, for the accommodation of the wedge-block 15 that rides on said first-mentioned wedge-block and to enable the upper wedge-block to pass above said side piece when the platform is elevated; and, as shown at 17, the bottom flange of each side piece 9 is cut away below the inclined face of each wedge-block 15, with which said last-mentioned side piece is provided, for the accommodation of the companion wedge-block 14 and to enable the side piece 9 to pass downward when said platform is depressed—see Figs. 7, 8, 9 and 10. Each side piece 9 is recessed at 18, behind the inclined edge of the rear wedge-block 15 carried by said side piece, to receive the axle 8, and to enable said side to be moved rearwardly and upwardly away from said axle and returned to former relation therewith.

When the platform is elevated or run up on the wedge-blocks the full distance, as shown in Fig. 3, the bottom flanges of the side pieces 9 engage the inside upper flanges of the side pieces 6 and so prevent either end of the platform from being tilted, and at no time can said platform tilt to an extent greater than the distance between the aforesaid flanges. Furthermore, the construction is such that the platform cannot move laterally independently of the body.

The advantages of the framework of my truck, constructed as just described, from standpoints of rigidity, stability, strength and durability, are clearly apparent.

A third roll or wheel 7 is provided to support the front end of the truck and for steering purposes. This front wheel 7 is mounted on an axle 19 journaled in a bifurcated swivel member 20 which has a vertical spindle or post 21 journaled in an upright part of or a bearing provided at the apex of the prow 1, such part or bearing appearing at 22. A washer 23 on the post 21 is interposed between the base of the bearing 22 and the top of the swivel 20. A nut 24 may be provided at the upper end of the post 21, above the top of the bearing 22, to prevent said post from getting out of place in the event the front end of the truck be raised from the floor for any purpose.

A handle or tongue 25, only the inner terminal of which appears in the drawings, is provided for the truck, and this tongue has a forked terminal 26 each branch of which is pivotally mounted on a pin 27 which projects from the corresponding side of the swivel 20. The branches of the terminal 26 extend downwardly or rearwardly, according to the position of the tongue 25, beyond the pins 27, to form two lifters 28. Being attached to the swivel 20, the tongue 25 is not only the medium by which the truck is propelled, but also by which it is steered.

The lifters 28 constitute parts of the operating mechanism for the platform, or for the body, as the case may be, which mechanism will now be described in full.

Two brackets or lugs 29 are rigidly attached to the front side of the forward end piece 11, and having its rear end pivotally attached at 30 to said lugs is a link 31. The link 31 is provided at its front end with a cross-head 32 that extends laterally from both sides thereof and is in the path of the lifters 28. A pair of links 33 is pivotally attached at 34 to opposite sides of the link 31, the lower or rear ends of said links 33, according to the position of the same, being the parts that are mounted on the pivot 34. The pivot 34 is situated behind the cross-head 32. The front end of each link 33 is pivoted at 35 to one side of a rearwardly projecting part of the upright or bearing 22. Each link 33 has a recess 36 in its front or bottom (according to position) edge in position to receive the adjacent arm of the cross-head 32 when said cross-head is elevated. Rising from the front end portion of each link 33 is an integral knock-off arm 37. Slidingly mounted in the upper part of the bearing 22 is a horizontal knock-off 38, the front end of which is in the path of the tongue 25 or of the closed end of the fork 26. The upper ends of the arms 37 are in the path of the rear end of the knock-off 38.

When the tongue 25 is in a vertical position, the platform is normally disposed and rests with the flanges of the side pieces 9 on the inner flanges of the side pieces 6, and the links 31 and 33 are down with the cross-head 32 bearing on the lifters 28, as best shown in Fig. 2. Thus disposed the top of the platform is below the horizontal plane of the tops of the wheels 7, although the upper surface of the flooring 13 is a little above such horizontal plane in the present construction. At this as at all times the upper wedge-blocks bear on the lower wedge-blocks.

When the tongue 25 is swung forwardly and downwardly on the pins 27 into an approximately horizontal position, the lifters 28, acting through the medium of the cross-head 32, swing the link 31 upwardly on its pivot 30 and at the same time swing the links 33 upwardly on their pivot 35, said links turning on the common axis provided by the pivot 34, until said cross-head comes to rest in the recesses 36 and so checks further upward movement of said links. This operation increases the distance between the pivots 30 and 35 and so forces the platform rearwardly or the body forwardly, and causes said platform to move up, as the wedge-blocks 15 move rearwardly on the wedge-blocks 14 or the latter are drawn forwardly beneath the former. The rigidity afforded by the construction at the front end of the truck, which includes the prow 1 and the bearing 22 securely attached thereto, is of a nature to enable the platform to be raised, in the manner just explained, even when it contains an exceedingly heavy load. The upward movement of the links is sufficient, by the time the cross-head comes to rest in the recesses 36, to locate the pivot 34 a trifle above the plane common to the pivots 30 and 35, so that the platform is locked in its elevated position by said links and cross-head and the link pivots. The upward movement of the links 33 throws the arms 37 forward into a vertical position and into contact with the knock-off 38, which latter by this action of said arms is thrust forwardly. The parts now stand as shown in Fig. 3. Upon again elevating the tongue 25 and forcing it against the knock-off 38, the latter drives back the arms 37 and so unlocks the links 31 and 33, by actuating the latter downwardly and carrying with them the link 31 until the pivot 34 passes below the plane common to the pivots 30 and 35, when the weight of the load or even of the platform causes said platform to ride down into its former depressed position again, either the wedge-blocks 15 sliding down on the wedge-blocks 14 or the latter sliding up on the former. The lifters 28 pass away from the cross-head 32 when the tongue 25 is swung upwardly and rearwardly, but said cross-head comes down onto said lifters as soon as the links are released or unlocked so that they can swing down into the position shown in Fig. 2.

Any load which the truck is adapted for can be raised and lowered speedily and with comparative ease by this mechanism.

The pile or stack of goods or material to be handled with my truck is supported from the floor at a sufficient height to enable said truck to be run under the same when the platform is depressed, and usually portable benches are provided to support such goods or material, such benches being raised, transported, and set down again with the goods or material on them during the entire operation.

Briefly, the operation of the truck as a whole is described as follows: The truck, with the tongue 25 down as a rule, is hauled to the vicinity of the load to be moved and backed up to the same, then said tongue is thrown upward and backward to lower the platform, through the medium of the knock-off 38, arms 37 and links 33 and 31, and the wedge-blocks, and the truck is backed beneath the load, entering between the side supports for said load, the same being the side supports of the bench when the latter is used. Next the tongue 25 is forced downward and forward to raise the load, which includes the bench when present, from the floor on or with the platform, through the medium of the lifters 28, cross-head 32, and links 31 and 33, and the wedge-blocks. The load is now hauled to the desired locality and there deposited by once more throwing up the tongue to lower the platform and permit the bench to descend onto the floor, or the load without the bench, in the absence of the latter, to descend onto other supporting means. Finally the truck is drawn from beneath the load and out of the way.

Obviously, when the elevating and lifting operation takes place, the tongue should and naturally will be held and actuated in the vertical plane of the longitudinal center of the truck, so that the lifters 28 can both properly engage the cross-head 32; in fact, the tongue should be retained in such plane whenever operated to actuate the mechanism by means of which the platform is either raised or lowered.

When the mechanism is operated to elevate the load and the platform or the flooring 13 comes into contact with the under surface of the load, there is usually so much frictional resistance that said platform is held stationary while the body of the truck moves forward on the wheels 7, but the desired result of elevating the platform and carrying the load up with it is attained just the same as though the body were held stationary and the platform were moved rearwardly as well as upwardly.

The truck, whether loaded or unloaded, is drawn about on its wheels by the tongue like any ordinary truck, said tongue then being held high enough at its front end to cause the lifters 28 to clear the cross-head 32 and permit the tongue to be swung in either direction for steering purposes.

While the ordinary use of the truck does not require the gradual lowering of the load, yet if desired, with my construction it can be slowly lowered by holding the tongue in a position to allow the trip to be operated, i. e., so that the arms 28 will catch the pins 30 as soon as the link-pivot passes the common plane, and then the free end of the tongue is allowed to move upwardly slowly, thus allowing the pins 22 to move slowly downwardly, and thus the platform may be controlled in its lowering motion, as may be desired. If so operated the trip is usually forced inwardly with the foot of the operator.

What I claim as my invention, and desire to secure by Letters Patent, is—

1. The framework of a truck comprising a body having side flanges and provided with wedge-blocks, and a superimposed platform having side flanges and provided with wedge-blocks to coöperate with said first-mentioned wedge-blocks, the top and bottom platform flanges being respectively above the top and bottom body flanges.

2. The combination, in a truck, with a body having side flanges and provided with wedge-blocks, and a superimposed platform having side flanges and provided with wedge-blocks to coöperate with said first-mentioned wedge-blocks, the top and bottom platform flanges being respectively above the top and bottom body flanges, of means to move horizontally either said platform or said body relatively to the other.

3. The combination, in a truck, with a body consisting in part of a prow having an upright, said body being provided with wedge-blocks, a tongue provided with lifting means, pivotal connections between said body and said tongue and a superimposed platform provided with wedge-blocks to coöperate with said first-mentioned wedge-blocks, of pivotally connected links pivotally connected with said upright and with said platform and one of such links having a member in the path of said lifting means.

4. The combination, in a truck, with a body consisting in part of a prow, a tongue provided with lifting means, a superimposed platform, pivotal connections between said prow and said tongue, and means to cause said platform to rise and fall when moved longitudinally on said body or when the latter is moved longitudinally beneath the former, of links pivotally connected with each other and with said prow and platform, one of such links having a part in the path of said lifting means, and one of such links being provided with a knock-off arm, and a knock-off movably mounted between said arm and said tongue.

5. The combination, in a truck, with a body consisting in part of a prow having an upright, said body being provided with wedge-blocks, a tongue provided with lifting means, pivotal connections between said body and said tongue, a suitably mounted movable knock-off arranged in the path of said tongue, and a superimposed platform provided with wedge-blocks to coöperate with said first-mentioned wedge-blocks, of links pivotally connected with each other and with said upright and said platform, one of such links being provided with a member in the path of said lifting means, and one of such links being provided with a member in the path of said knock-off.

6. The combination, in a truck, with a body consisting in part of a prow, said body being provided with wedge-blocks, and said prow being provided with a bearing, an axle and wheels arranged to support the rear end of said body, a swivel having its post journaled in said bearing and provided with a wheel to support the front end of said body and to serve as the steering medium for the truck, a tongue pivotally connected with said swivel and provided with lifters, and a knock-off slidingly mounted in said bearing in the path of said tongue, of a platform provided with wedge-blocks slidingly mounted relative to said first-mentioned wedge-blocks, and links pivotally connected with each other and with said bearing and said platform, one of such links being provided with a cross-head arranged in the path of said lifters and adapted to limit the upward swing of said links, and one of said links being provided with an arm in the path of said knock-off.

7. The combination, in the framework of a truck, with a body having flanged side pieces and provided with wedge-blocks, of a superimposed platform having flanged side pieces arranged above and between the flanges on said first-mentioned side pieces, and provided with wedge-blocks arranged in sliding relation to said first-mentioned wedge-blocks, the upper flanges of the body side pieces being cut away to accommodate the platform wedge-blocks and the bottom flanges of the platform side pieces being cut away to accommodate the body wedge-blocks.

8. The combination, in a truck, with a suitable body and a suitable superimposed platform arranged for relative horizontal movement, such body having an upright at its front end, and means to convert such movement into a vertical movement, of a tongue provided with a lifter, pivotal connections between said body and said tongue and links pivotally connected with each other and with said upright and said platform, one of such links having a member in the path of said lifter.

9. The combination, in a truck, with a suitable body and a suitable superimposed platform arranged for relative horizontal movement, such body having an upright at its front end, and means to convert said movement into a vertical movement, of a tongue provided with a lifter, pivotal connections between said body and said tongue, a knock-off slidingly mounted in said upright in the path of said tongue, and links pivotally connected with each other and with said upright member and said platform, one of said links being provided with a member in the path of said lifter, and one of said links being provided with a member in the path of said knock-off.

WALTER LOOMIS HAMILTON.

Witnesses:
F. A. CUTTER,
A. C. FAIRBANKS.